United States Patent Office 2,924,607
Patented Feb. 9, 1960

2,924,607

PREPARATION OF OXETANES

Dexter B. Pattison, Wilmington, Del., assignor to E. I. du Pont de Nemours and Company, Wilmington, Del., a corporation of Delaware No Drawing. Application October 18, 1957
Serial No. 690,901

7 Claims. (Cl. 260—333)

This invention relates to a novel process for the preparation of certain 3,3-disubstituted oxetanes.

Oxetanes (also known as oxacyclobutanes) are well-known compounds which can be polymerized to polymers of various molecular weights. See Farthing, J. Chem. Soc., November 1955, pages 3648 to 3654 and Rose, J. Chem. Soc., March 1956, pages 542 to 555. The hydrolytic and thremal stability of the ether linkages in the polymers has rendered them of considerable interest to the art for the manufacture of films, plastics, etc.

A variety of methods have been proposed for making oxetanes. For example, Farthing (above cited) has disclosed their preparation by ring-closing 1,3-halohydrins and Rose (above cited) has disclosed their preparation by ring closing 1,3-haloacetates. Such procedures have not proved to be entirely satisfactory, generally resulting in low yields and being expensive. It has also been proposed to prepare an oxetane containing a methylol group by pyrolysis of a methylol substituted cyclic carbonate of a 1,3-diol. This latter method is not a general method because, if the cyclic carbonate is not activated by the presence of a methylol group, it will not decompose to form the oxetane.

It is an object of this invention to provide a new and improved process for preparing 3,3-dialkyl oxetanes and 3-alkyl-3-allyloxymethyl oxetanes. Another object is to provide such a process wherein the oxetanes are obtained from cyclic carbonate esters of the appropriate 2,2-disubstituted-1,3-propanediols in the presence of a novel catalyst therefor. A further object is to advance the art. Still other objects will appear hereinafter.

The above and other objects are accomplished by this invention which comprises heating the cyclic carbonate ester of a 2,2-disubstituted 1,3-propanediol in which one substituent is an alkyl group of 1-4 carbon atoms and the other substituent is a member of the group consisting of alkyl groups of 2-4 carbon atoms and an allyloxymethyl group at a temperature of from about 175° C. to about 240° C. in the presence of from about .015% to about 1.6% by weight of lithium in the form of a member of the group consisting of lithium salts, lithium hydroxide, lithium oxide and lithium amide, and recovering the corresponding 3,3-disubstituted oxetane from the reaction mixture. The reaction may be represented by the following equation:

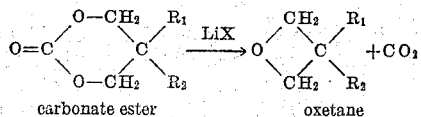

carbonate ester      oxetane wherein $R_1$ represents an alkyl group of 1 to 4 carbon atoms, $R_2$ represents an alkyl group of 2 to 4 carbon atoms or an (allyloxy)methyl group

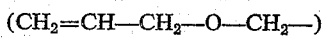

and LiX represents the lithium compound. By this procedure using the lithium catalyst, the oxetanes of this invention are obtained in higher yields than those obtained by the prior art processes and the process is less expensive than the prior processes.

The cyclic carbonate esters, employed in the process of this invention, may be made by known methods. They are easily and conveniently made by an ester interchange reaction between approximately equimolar amounts of the corresponding 2,2-disubstituted 1,3-propanediol and a dialkyl carbonate or cyclic alkylene carbonate such as diethyl carbonate, dibutyl carbonate, cyclic ethylene carbonate, or a diaryl carbonate such as diphenyl carbonate, preferably diethyl carbonate or cyclic ethylene carbonate. The reaction proceeds in the presence of about 0.05% by weight of potassium carbonate based on the weight of the reactants and heating under reflux conditions whereby the alcohol is distilled off to aid in driving the reaction to completion. The potassium carbonate need not be removed from the resulting cyclic carbonate ester prior to the conversion of the ester to the oxetane, unless a continuous conversion process is employed which would result in the accumulation of inconveniently large amounts of potassium carbonate in the system.

The 2,2-disubstituted 1,3-propanediols can be prepared conveniently by reaction of the dialkyl and the alkyl-allyloxymethyl substituted acetaldehydes, such as 2-ethyl butyraldehyde, butylethylacetaldehyde, and methyl(allyloxymethyl)acetaldehyde with formaldehyde by conventional procedures. The 2,2-diethyl-1,3-propanediol is commercially available. Preferably, the 2-(allyloxy) methyl-2-alkyl-1,3-propanediols are prepared by reacting a trimethylol alkane, $$\begin{array}{c} CH_2OH \\ | \\ R_1-C-CH_2OH \\ | \\ CH_2OH \end{array}$$

with methyl ethyl ketone in the presence of p-toluene sulfonic acid under reflux to separate water and form the hydroxy ketal

then converting this ketal to its sodium salt by reaction with sodium in toluene under reflux; then adding allyl bromide to a solution of the sodium salt in toluene at about 119–127° C. with refluxing of the toluene to form the allyloxymethyl ketal

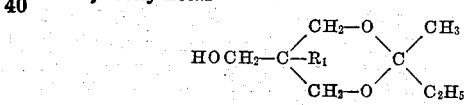

and then adding p-toluene sulfonic acid and water to that ketal and boiling whereby a methylethyl ketone-water azeotrope distills off with the formation of the 2-(allyloxy)methyl-2-alkyl-1,3-propanediol

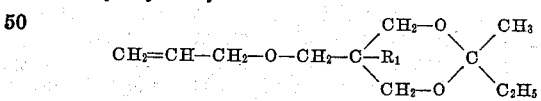

$R_1$ being the alkyl group of 1-4 carbon atoms. The processes for preparing the 2,2-disubstituted 1,3-propanediols do not constitute a part of this invention, the above disclosed process for preparing the 2-(allyloxy)methyl-2-alkyl-1,3-propanediols being the invention of another.

The carbonate esters, employed in the process of this invention, must be heated in the presence of from about .015% to about 1.6% by weight of lithium in the form of an active lithium compound, preferably from about 0.28% to about 0.40% by weight. Suitable (active) lithium compounds are lithium amide, lithium hydroxide, lithium oxide and lithium salts such as the chloride, bromide, iodide, fluoride, carbonate, perchlorate, sulfate, borate, acetate, succinate, and the like, lithium chloride being preferred. If materially less than 0.015% of the lithium catalyst is employed, the rate of reaction becomes inconveniently slow. Excessive amounts of the catalyst give no material advantage and are wasteful. Agitation may be provided, if desired, but is not essential.

The catalytic action to produce the oxetanes appears to be peculiar to lithium compounds. Unlike the carbonate esters containing a methylol group, the cyclic carbonate esters of this invention appear to be stable at temperatures up to at least 240° C. and may be heated up to those temperatures in the absence of a catalyst without loss of carbon dioxide and conversion to the oxetane. Also, materials, such as potassium carbonate, activated carbon, magnesium chloride, tetramethylammonium chloride, and the like, are ineffective in the process of this invention for the production of the oxetanes of this invention from the corresponding cyclic carbonate esters. In view of these facts, the results obtained by the process of this invention are entirely unexpected. Particularly, since potassium carbonate is ineffective, it is very surprising that lithium carbonate, for example, promotes the formation of the oxetanes.

The temperature employed in the process of this invention should be in the range of about 175° C. to about 240° C., preferably from about 200° C. to about 220° C. where the reaction proceeds at a convenient rate, requiring about 2 to about 3 hours. At temperatures materially below 175° C., the rate of reaction is undesirably slow. Temperatures materially above 240° C. present no substantial advantage, but there is a possibility of damaging the product by exposing it to such excessive temperatures.

The time needed for completion of the reaction will depend to some extent on the temperature and the catalyst concentration employed. In general, about 1 to about 5 hours is sufficient. The progress of the reaction can be followed readily by measuring the amount of carbon dioxide evolved.

The process may be run at about atmospheric pressure or at subatmospheric pressure. Generally, it is preferred to operate at subatmospheric pressure, particularly at a pressure below the vapor pressure of the oxetane to be produced and above the vapor pressure of the cyclic carbonate ester at the reaction temperature being employed, whereby the oxetane will distill out as it is formed. During the process, further amounts of the carbonate ester may be added, if desired, to replace that consumed and thus to maintain a substantially constant quantity of carbonate ester in the reaction vessel, thereby producing the oxetane in a continuous manner.

In order to more clearly illustrate this invention, preferred modes of practicing it, and the advantageous results to be obtained thereby, the following examples are given in which the amounts of materials employed are by weight except where otherwise specifically indicated:

EXAMPLE 1

(A) *Preparation of the carbonate ester*

A mixture of 347 g. (2.63 mole) of 2,2-diethyl-1,3-propanediol, 326 g. (2.75 mole) of diethyl carbonate, and 0.3 g. of potassium carbonate is heated one hour under reflux. Ethyl alcohol, B.P. 78° C., is then distilled out of the reaction mixture at atmospheric pressure. The pot temperature is raised gradually to 150° C. during this distillation. When the pot temperature reaches 150° C., the pressure in the system is gradually reduced to about 5 mm. of Hg in order to remove the unreacted excess diethyl carbonate and the residual ethyl alcohol. The carbonate ester of 2,2-diethyl-1,3-propanediol is ready for conversion to the oxetane without further purification.

(B) *Conversion of the carbonate ester to 3,3-diethyl oxetane*

The carbonate ester obtained by the procedure of part A is treated with 0.4 g. of lithium amide, corresponding to about .029 by weight of lithium based on the carbonate ester. The reaction flask is heated at 200–210° C. (50–60 mm. Hg) for a 5-hour period during which carbon dioxide is evolved and 3,3-diethyl oxetane distills over. The condensate is fractionally distilled to give 94.2 g. of product, B.P. 136–140.5 (760 mm. Hg).

*Analysis.*—Calcd. for $C_7H_{14}O$: C, 73.6; H, 12.3. Found: C, 73.65; H, 12.45. The conversion is about 31% of theory (based on the initial 2,2-diethyl-1,3-propanediol).

EXAMPLE 2

(A) *Preparation of the carbonate ester*

A mixture of 198 g. (1.5 moles) of redistilled 2,2-diethyl-1,3-propanediol (B.P. 126° C. at 12 mm. Hg), 195 g. (1.65 moles) of diethyl carbonate, and 0.20 g. of potassium carbonate is heated with agitation under reflux until the pot temperature falls to about 105° C. and the vapor temperature is 78° C. About 20 minutes is required before this happens. A short fractionation column is fitted and ethyl alcohol is removed by distillation at atmospheric pressure while agitation is continued. The temperature of the pot gradually rises during this distillation. When the pot temperature reaches 150° C., the pressure in the system is gradually reduced to 12 mm. Hg. Unreacted excess diethyl carbonate and residual ethyl alcohol are removed.

(B) *Conversion of the carbonate ester to 3,3-diethyl oxetane*

The distillation residue obtained by the procedure of part A is cooled below 100° C. and agitated with 4 g. of lithium chloride, corresponding to about 0.28% by weight of lithium based on the carbonate ester. External heat is applied and the pressure in the system is reduced to about 100–150 mm. Hg. The carbon dioxide evolution is vigorous and the distillation of material from the flask is rapid when the pot temperature is between 210–215° C. (the head temperature rises from about 60 to 72° C. during this period). Finally, the pot temperature rises to 240° C. and the pressure in the system drops to 50 mm. Hg. Only a small amount of material remains in the flask.

Approximately 143 g. of distillate is collected in the receiver and 26 g. is caught in a cold trap. Both fractions are combined and fractionally distilled using a high reflux ratio at atmospheric pressure. The 3,3-diethyl oxetane is obtained in about a 57% yield (91.5 g. of product boiling at 139–141° C.). A small amount (11.2 g.) of 2-ethylbutyraldehyde is obtained boiling at 117–118° C.

EXAMPLE 3

(A) *Preparation of the carbonate ester*

2-ethyl-2-butyl-1,3-propanediol is converted to the cyclic carbonate ester by the procedure given in part A of Example 2 using 160 g. (1.0 mole) of redistilled 2-ethyl-2-butyl-1,3 propanediol, 130 g. (1.10 moles) of diethyl carbonate, and 0.14 g. of potassium carbonate.

(B) *Conversion of the carbonate ester to 3-ethyl-3-butyl oxetane*

The cyclic carbonate ester and 3.2 g. of lithium chloride (corresponding to about 0.28% by weight of lithium based on the carbonate ester) are agitated at a pot temperature of 200–210° C. and a system pressure of 100–120 mm. Hg for 2.5 hours. During this time, vigorous evolution of carbon dioxide is observed. Most of the material in the pot distills over. About 142 g. of condensate is collected. It is redistilled through an efficient fractionating column to yield about 60 g. of 3-ethyl-3-butyl oxetane boiling at 99–101° C. (48 mm. Hg).

*Analysis.*—Calcd. for $C_9H_{18}O$: C, 76.1; H, 12.7. Found: C, 76.1; H, 12.9.

About 38 g. of unreacted 2-ethyl-2-butyl-1,3-propanediol and its cyclic carbonate is recovered. The conversion to 3-ethyl-3-butyl oxetane is about 35% of the theoretical value (based on the initial 2-ethyl-2-butyl-1,3-propanediol); the yield is about 55%.

EXAMPLE 4

(A) *Preparation of the carbonate ester*

The cyclic carbonate ester of 2-(allyloxy)methyl-2-methyl-1,3-propanediol is prepared by the procedure of part A of Example 2 from 80 g. (.50 mole) of 2-(allyloxy)methyl-2-methyl-1,3-propanediol, 70 g. (.59 mole) of diethyl carbonate, and 0.07 g. of potassium carbonate.

(B) *Conversion of the carbonate ester to 3-methyl-3-(allyloxy)methyl oxetane*

The cyclic carbonate obtained in part A is stirred with 1.6 g. of lithium chloride, corresponding to about 0.28% by weight of lithium based on the carbonate ester. The mixture obtained is agitated and heated while the pressure in the system is reduced to 40–70 mm. Hg. When the pot temperature is about 200–210° C., distillation of material from the pot occurs fairly rapidly. The condensate is purified by distillation through an efficient fractionating column. 3-methyl-3-(allyloxy)methyl-oxetane is obtained in two fractions: 13.0 g. B.P. 84:85° C. (27 mm.) and 6.1 g., B.P. 85–85.5° C. 27 mm.).

*Analysis.*—Calcd. for $C_8H_{14}O_2$: C, 67.6; H, 9.9. Found: C, 67.2; H, 10.0.

EXAMPLE 5

(A) *Preparation of the cyclic carbonate ester*

A mixture of 66 g. (0.50 mole) of 2,2-diethyl-1,3-propanediol, 65 g. (0.55 mole) of diethyl carbonate, and 0.1 g. of potassium carbonate is heated under reflux with stirring. Ethyl alcohol, B.P. 78° C., is then distilled out of the reaction mixture at atmospheric pressure. The pot temperature is raised gradually to 150° C. during the distillation. When the pot temperature reaches 150° C., the pressure in the system is gradually reduced to about 10 mm. of Hg in order to remove the unreacted excess diethyl carbonate and the residual ethyl alcohol. The cyclic carbonate ester of 2,2-diethyl-1,3-propanediol is ready for conversion to the oxetane without further purification.

(B) *Conversion of the cyclic carbonate ester to 3,3-diethyl oxetane*

The mixture prepared in A above is cooled and 6.6 g. of lithium carbonate (about 1.58% by weight of lithium based on the carbonate ester) is added. The reaction mixture is agitated at 205–220° C. (50–70 mm. of Hg). Carbon dioxide is evolved. A total of 44 g. of distillate is collected which on fractionation yields 34.6 g. of the unreacted cyclic carbonate ester of 2,2-diethyl-1,3-propanediol and 5.2 g. of 3,3-diethyl oxetane.

EXAMPLE 6

(A) *Preparation of the cyclic carbonate ester*

The cyclic carbonate ester of 2,2-diethyl-1,3-propanediol is prepared from 66 g. (0.5 mole), of 2,2-diethyl-1,3-propanediol, 65 g. (0.55 mole) of diethyl carbonate, and 0.1 g. of potassium carbonate by the procedure described in part A of Example 5.

(B) *Conversion of the cyclic carbonate ester to 3,3-diethyl oxetane*

The cyclic carbonate ester prepared in part A above is treated by addition of 6.6 g. of lithium bromide, corresponding to about 0.67% by weight of lithium based on the carbonate ester. The mixture is then distilled at a pot temperature of 175–185° C. (80–130 mm. Hg) for a 20-minute period. The distillate is fractionated by a subsequent distillation through an efficient column to yield 9.7 g. of 3,3-diethyl oxetane and 19.2 g. of the cyclic carbonate ester of 2,2-diethyl-1,3-propanediol.

The following examples are given for purposes of comparison and do not fall within the scope of this invention;

EXAMPLE 7

To 79 g. (0.50 mole) of the carbonate ester of 2,2-diethyl-1,3-propanediol was added 1.6 g. of magnesium chloride and the mixture heated to 210° C. (120 mm. Hg). No reaction occurred.

EXAMPLE 8

(A) *Preparation of cyclic carbonate ester*

A mixture of 39.6 g. (0.30 mole) of 2,2-diethyl-1,3-propanediol, 38.9 g. (0.33 mole) of diethyl carbonate, and 0.10 g. of potassium carbonate (1.27% by weight based on the reactants) was heated under reflux in a reaction vessel equipped with an efficient fractionating column, the ethyl alcohol liberated during the ester interchange was distilled off. In order to remove the residual ethyl alcohol and the excess diethyl carbonate, the pot temperature was finally raised to 150° C. and the pressure was lowered to 15 mm. Hg.

(B) *Treatment of the cyclic carbonate ester*

The pot residue obtained in A above, containing excess potassium carbonate, was heated to 250° C. at atmospheric pressure. The foaming, which is noticeable when the carbonate decomposes to carbon dioxide and an oxetane, was not observed. When 1 g. of activated carbon was added, the cyclic carbonate ester still would not decompose. The pressure was reduced to 120 mm. of Hg. A distillate composed mainly of the cyclic carbonate ester of 2,2-diethyl-1,3-propanediol and a small amount of free 2,2-diethyl-1,3-propanediol was collected, but no oxetane was obtained.

EXAMPLE 9

To 60 g. of the cyclic carbonate ester of 2,2-diethyl-1,3-propanediol was added 0.30 g. of tetramethylammonium chloride and the mixture heated at 200 C. under reduced pressure in a reaction vessel equipped with an efficient fractionating column. The ester did not decompose. However, when 1.20 g. of lithium chloride was added to this mixture, gas evolution was observed and, in the following hour, 18 g. of the oxetane were collected.

Examples 7 to 9 show that cyclic carbonate esters of the type employed in the process of this invention are not decomposed to form the oxetanes when heated at temperatures of 200–250° C. in the presence of substances such as magnesium chloride, potassium carbonate, activated carbon, and tetramethylammonium chloride, in the absence of a lithium compound. In other words, such other substances are not effective as catalysts with the esters and under the conditions of the process of this invention. It will be understood that the preceding Examples have been given for illustrative purposes solely and that this invention is not restricted to the specific embodiments set forth in Examples 1 to 6. On the other hand, it will be readily apparent to those skilled in the art that many variations and modifications can be made in the materials, proportions, conditions and techniques employed within the limits set forth in the general description without departing from the spirit and scope of this invention.

The oxetanes obtained by the process of this invention are particularly valuable for copolymerization with tetrahydrofuran for the production of millable, sulfur curable polyalkyleneether polymers having a molecular weight of at least 30,000 and valuable elastomeric properties. The 3,3-diethyl oxetanes improve the freeze resistance of the elastomers and the 3-alkyl-3-(allyloxy)-methyl oxetanes provide additional cure sites therein. In the copolymerization, a mixture of the oxetane and at least 50 mole percent preferably 75–95 mole percent, of tetrahydrofuran are subjected to polymerization at temperatures within the range of −80° C. to +70° C. in the presence of 0.01–0.5 mole percent of a cationic catalyst such as the well-known Friedel-Craft catalysts until the desired degree of polymerization is obtained. The resulting elastomeric polymers may be milled in conventional rubber processing equipment and cured with 0.1 to 2.0 percent by weight of sulfur at 125–160° C. in the presence of conventional rubber vulcanization accelerators and other conventional rubber compounding agents. Such elastomeric polymers have good thermal and hydrolytic stability.

The copolymers of these oxetanes with tetrahydrofuran and the like, the process for preparing them and the process of curing them form no part of this invention, but constitute the inventions of others.

From the preceding, it is apparent that this invention provides a novel process for preparing a class of oxetanes which are valuable and have a wide range of utilities. The process is simple, easy and economical to operate and produces the desired oxetanes in satisfactory high yields. Accordingly, it is apparent that this invention constitutes a valuable advance in and contribution to the art.

The embodiments of the invention in which an exclusive property or privilege is claimed are defined as follows:

1. The process for preparing 3,3-disubstituted oxetanes which comprises heating the cyclic carbonate ester of 2,2-disubstituted 1,3-propanediol in which one substituent is an alkyl group of 1–4 carbon atoms and the other substituent is a member of the group consisting of alkyl groups of 2–4 carbon atoms and an allyloxymethyl group at a temperature of from about 175° C. to about 240° C. in the presence of from about .015% to about 1.6% by weight of lithium in the form of a member of the group consisting of inorganic lithium salts, lithium hydroxide, lithium oxide and lithium amide, and separating the corresponding 3,3-disubstituted oxetane from the reaction mixture.

2. The process for preparing a 3,3-dialkyl oxetane which comprises heating the cyclic carbonate ester of 2,2-dialkyl 1,3-propanediol in which one substituent is an alkyl group of 1–4 carbon atoms and the other substituent is an alkyl group of 2–4 carbon atoms at a temperature of from about 175° C. to about 240° C. in the presence of from about 0.015% to about 1.6% by weight of lithium in the form of lithium chloride, and separating the corresponding 3,3-disubstituted oxetane from the reaction mixture.

3. The process for preparing 3,3-diethyl oxetane which comprises heating the cyclic carbonate ester of 2,2-diethyl-1,3-propanediol at a temperature of from about 200° C. to about 220° C. in the presence of from about 0.28% to about 0.40% by weight of lithium in the form of lithium chloride, and separating 3,3-diethyl oxetane from the reaction mixture.

4. The process for preparing 3,3-disubstituted oxetanes which comprises heating the cyclic carbonate ester of 2,2-disubstituted 1,3-propanediol in which one substituent is an alkyl group of 1–4 carbon atoms and the other substituent is an allyloxymethyl group at a temperature of from about 200° C. to about 220° C. in the presence of from about 0.28% to about 0.40% by weight of lithium in the form of lithium chloride, and separating the corresponding 3,3-disubstituted oxetane from the reaction mixture.

5. The process for preparing 3-methyl-3-(allyloxy)-methyl oxetane which comprises heating the cyclic carbonate ester of 2-(allyloxy)methyl-2-methyl-1,3-propanediol at a temperature of from about 200° C. to about 220° C. in the presence of from about 0.28% to about 0.40% by weight of lithium in the form of lithium chloride, and separating 3-methyl-3-(allyloxy)methyl oxetane from the reaction mixture.

6. The process for preparing a 3,3-dialkyl oxetane which comprises heating the cyclic carbonate ester of 2,2-dialkyl 1,3-propanediol in which one alkyl group contains 1–4 carbon atoms and the other alkyl group contains 2–4 carbon atoms at a temperature of from about 175° C. to about 240° C. in the presence of from about 0.015% to about 1.6% by weight of lithium in the form of lithium bromide, and separating the corresponding 3,3-disubstituted oxetane from the reaction mixture.

7. The process for preparing a 3,3-dialkyl oxetane which comprises heating the cyclic carbonate ester of 2,2-dialkyl 1,3-propanediol in which one alkyl group contains 1–4 carbon atoms and the other alkyl group contains 2–4 carbon atoms at a temperature of from about 175° C. to about 240° C. in the presence of from about 0.015% to about 1.6% by weight of lithium in the form of lithium amide, and separating the corresponding 3,3-disubstituted oxetane from the reaction mixture.

References Cited in the file of this patent

FOREIGN PATENTS

| | | |
|---|---|---|
| 845,937 | Germany | Aug. 7, 1952 |
| 17,415 | Germany | Aug. 2, 1956 |